United States Patent
Mitra et al.

(10) Patent No.: US 9,432,224 B1
(45) Date of Patent: Aug. 30, 2016

(54) METHOD AND APPARATUS FOR LOW-COMPLEXITY ISI ESTIMATION USING SPARSE DISCONTINUOUS TIME-DOMAIN PILOTS

(71) Applicant: Huawei Technologies Co., Ltd., Shenzhen (CN)

(72) Inventors: Jeebak Mitra, Ottawa (CA); Zhuhong Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/841,438

(22) Filed: Aug. 31, 2015

(51) Int. Cl.
*H04L 25/03* (2006.01)
*H04L 1/20* (2006.01)
*H04B 1/00* (2006.01)
*H04L 27/26* (2006.01)

(52) U.S. Cl.
CPC ........... *H04L 25/03821* (2013.01); *H04B 1/00* (2013.01); *H04L 1/20* (2013.01); *H04L 27/2647* (2013.01); *H04L 27/2675* (2013.01)

(58) Field of Classification Search
CPC . H04L 1/20; H04L 27/2647; H04L 27/2675; H04B 1/00
See application file for complete search history.

(56) References Cited

U.S. PATENT DOCUMENTS

| | | | |
|---|---|---|---|
| 6,347,125 B1 * | 2/2002 | Dent | H03M 13/41 375/341 |
| 2003/0036359 A1 * | 2/2003 | Dent | H04L 27/367 455/63.1 |

OTHER PUBLICATIONS

Beex, A., et al., "On Averaging Burg Spectral Estimators for Segments," IEEE Transactions on Acoustics, Speech and Signal Processing, vol. 34, No. 6, pp. 1473-1484, Dec. 198.

Selmi, M., "Block-Wise Digital Signal Processing for PolMux QAM/PSK Optical Coherent Systems," Journal of Lightwave Technology, vol. 29, pp. 3070-3082, Oct. 2011.

* cited by examiner

*Primary Examiner* — Ross Varndell
(74) *Attorney, Agent, or Firm* — Slater Matsil, LLP

(57) ABSTRACT

It is possible to perform ISI estimation for quasi-static band-limited communication channels using a minimal number of discontinuous pilots communicated across different time intervals. In one example, at least two frames are received in different time intervals, and noise vectors are extracted from pilots carried in the respective frames. Spectral estimation is performed on the noise vectors, collectively, to obtain a set of tap coefficients, which are then used to perform ISI equalization on at least one of the frames. In this way, ISI equalization is performed on a frame communicated in one time interval using at least some pilots communicated in another time interval. Using discontinuous pilots to perform channel estimation may enable lower pilot densities in next-generation communication systems.

22 Claims, 10 Drawing Sheets

METHOD AND APPARATUS FOR LOW-COMPLEXITY ISI ESTIMATION USING SPARSE DISCONTINUOUS TIME-DOMAIN PILOTS

TECHNICAL FIELD

The present invention relates generally to reducing interference in communications systems, and in particular embodiments, to techniques and mechanisms for low complexity ISI estimation using sparse discontinuous time-domain pilots for use in post-filtering and multi-symbol equalization techniques.

BACKGROUND

In high speed communication systems, there is a growing concern regarding implementation constraints as well as lowering the power consumption of the transceivers. Thus, being able to provide satisfactory performance with the lowest possible implementation complexity is increasingly important. In coherent communication systems, for example, an accurate estimate of the channel is required for proper functioning of the system. However, system resources are heavily expended on such overhead tasks if the channel needs to be estimated often or uses several pilot symbols. Furthermore, in several communication systems the received signal is conditioned in several stages. For example, in dual-polarization coherent optical systems, compensation for chromatic dispersion and polarization mode dispersion is performed in multiple stages to reduce implementation complexity. Various linear equalization techniques as applicable to coherent optical transceivers are described in Institute of Electrical and Electronic Engineers (IEEE) publication entitled "Block-Wise Digital Signal Processing for PolMux QAM/PSK Optical Coherent Systems", IEEE Journal of Lightwave Technology, Vol. 29, No. 20. October 2011, which is incorporated by reference herein as if reproduced in its entirety. Conventional linear equalization techniques may be unable to sufficiently compensate for ISI in systems employing high symbol transmission rates. The residual ISI remaining after conventional linear equalization may significantly degrade system performance when decoding of each symbol is done independently. A multiple-symbol equalization approach may be one alternative for high baud rate systems, but may require several implementation optimizations in order to be acceptable for high speed lower power designs. Additionally, linear equalization is known to be susceptible to noise enhancement in the presence of non-negligible ISI. Thus, systems and methods that facilitate low-complexity means of estimating such residual ISI, and consequently the use of limited memory multi-symbol equalizers, are important for future high data rate communication system design.

SUMMARY OF THE INVENTION

Technical advantages are generally achieved by embodiments of this disclosure which describe a method and apparatus for techniques and mechanisms for low complexity ISI estimation using sparse discontinuous time-domain pilots for use in post-filtering and multi-symbol equalization techniques.

In accordance with an embodiment, a method for performing inter-symbol interference (ISI) estimation. In this example, the method includes receiving a first frame and a second frame of a signal. The first frame and the second frame are communicated during different time intervals. Extracting a first noise vector from at least one pilot carried by the first frame and a second noise vector from at least one pilot carried by the second frame, storing the first noise vector and the second noise vector in a buffer, performing spectral estimation on at least the first noise vector and the second noise vector to obtain a first set of tap coefficients, and performing ISI equalization on the second frame in accordance with the first set of tap coefficients to remove residual ISI from symbols in the second frame. An apparatus for performing this method is also provided.

In accordance with yet another embodiment, a method for dynamically activating or deactivating an equalizer is provided. In this example, the method includes receiving a signal carrying at least a leading symbol and a trailing symbol, extracting a noise vector from at least one pilot carried by the signal, and performing spectral estimation on the noise vector to obtain at least a first tap coefficient and a second tap coefficient. The first tap coefficient corresponds to an energy level of a leading symbol in the signal. The second tap coefficient corresponds to an amount of energy that leaks from the leading symbol to the trailing symbol as a result of inter-symbol interference (ISI). The method further includes activating an ISI equalizer when a ratio of the second tap coefficient to the first tap coefficient exceeds a first threshold, wherein the ISI equalizer is configured to perform ISI equalization on the signal when activated.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
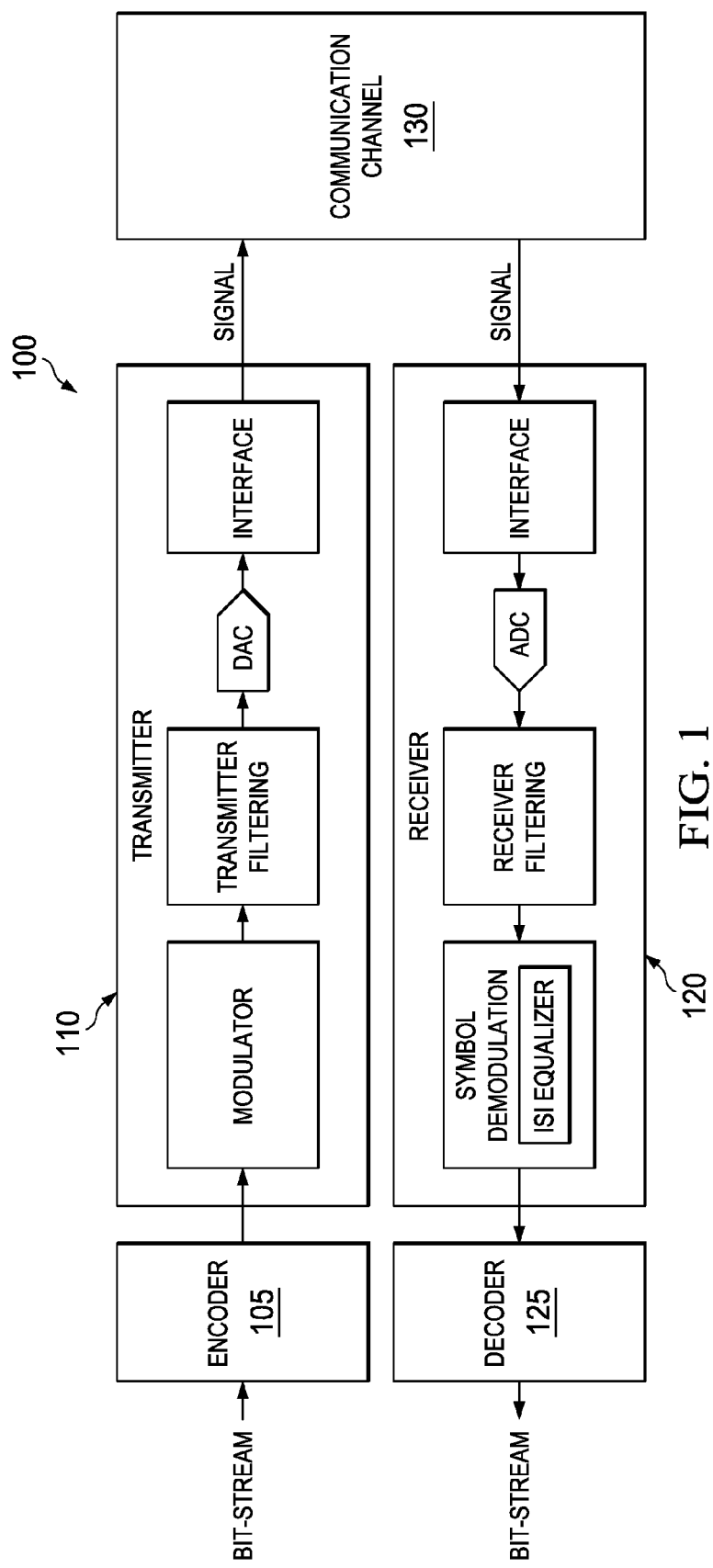
FIG. 1 is a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Channel estimation is performed to assess the characteristics of a channel over which a signal propagates. The resulting channel statistics are then used to process (e.g., filter) the signal in a manner that compensates for distortion introduced by the channel. In the context of ISI equalization, channel estimation is performed to estimate memory characteristics of the channel. The memory characteristics relate to the degree to which leading symbols interfere with trailing symbols, and can be used to condition the signal prior to symbol demodulation.

Data-aided channel estimation generally includes analyzing pilots carried in the signal. Pilots are known symbols that constitute overhead in the signal. On one hand, communicating more pilots than are necessary to support a desired level of channel estimation reduces channel throughput, as the excess pilots take up resources that could have been used to transport data. On the other hand, communicating fewer pilots than are necessary to support the desired level of channel estimation may require the receiver to perform blind decoding to maintain acceptable error rates, which typically involves fairly complex signal processing techniques that introduce latency into the decoding process. Blind detection may also have system design ramifications. For example, blind detection algorithms may require parameter adjustments to adapt to different constellation sizes, and consequently, it may be difficult to implement blind detection in a manner that is independent of the modulation scheme being used. For these reasons, many conventional communication protocols rely primarily on pilots to provide channel estimation, and as a result, often include relatively high pilot densities when accurate channel estimates are desired. For example, some cellular protocols (e.g., Long Term Evolution (LTE), LTE-Advanced) may dedicate more than ten percent of their payload to carrying pilot symbols. Other systems (e.g., optical, microwave) have somewhat lower pilot densities.

Since distortion may be time-varying, pilots are typically communicated during each time interval. Accordingly, conventional equalization techniques process a frame communicated in a given time interval using only those pilots communicated in that time interval. However, in practice, channels often exhibit at least some coherence in the time domain, such that the channel is quasi-static across periods of two or more time intervals.

Embodiments provided herein exploit the quasi-static nature of communication channels by performing ISI estimation using discontinuous pilots communicated across different time intervals. In one example, at least two frames are received in different time intervals, and noise vectors are extracted from pilots carried in the respective frames. Spectral estimation is performed on the noise vectors, collectively, to obtain a set of tap coefficients, which are then used to perform ISI equalization on at least one of the frames. In this way, ISI equalization is performed on a frame communicated in one time interval using at least some pilots communicated in another time interval. Using discontinuous pilots to perform channel estimation may enable lower pilot densities in next-generation communication systems.

Embodiments provided herein further provide techniques for dynamically activating/deactivating an ISI equalizer to improve signal decoding efficiency. Notably, ISI equalization consumes processing resources and increases the amount of time required to perform decoding. In some instances, the conditions of a channel may be such that relatively low amounts of ISI are introduced into the signal. In such instances, it may be possible to achieve acceptable error rates without performing ISI equalization, thereby improving decoding efficiency. Embodiment techniques gauge the level of ISI in a signal based on a ratio between tap coefficients derived from pilots carried by the signal. When the ratio between the tap coefficients rises above a threshold, an ISI equalizer is activated. When the ratio between the tap coefficients falls below a threshold, the ISI equalizer is de-activated. The ratio between tap coefficients can be used to gauge ISI in the signal because tap coefficients generally correspond to the amount of energy that leaks from one symbol to the next. For example, in a given set of tap coefficients, the first tap coefficient typically corresponds to an energy level of a leading symbol in the signal, while the second tap coefficient generally corresponds to an amount of energy that leaks from the leading symbol to a trailing symbol in the signal. Thus, the ratio between the second tap coefficient and the first tap coefficient increases when more energy from the leading symbol leaks into the trailing symbol. These aspects are described in greater detail below.

FIG. 1 is a diagram of a communications system 100 in which a signal is communicated from a transmitter 110 to a receiver 120 over a communication channel 130. As shown, an encoder 105 encodes a bit-stream, and forwards the encoded bit-stream to the transmitter 110. The encoder 105 may use any type of encoding scheme, including a forward error correction (FEC) encoding scheme. The transmitter 110 then modulates the encoded bit-stream by mapping bits in the encoded bit stream to modulation symbols (e.g., QAM symbols, QPSK symbols), and performs additional signal processing steps (e.g., filtering, digital to analog conversion (DAC), amplification) to obtain a signal. The signal is then transmitted over the communication channel 130 to the receiver 120. The communication channel 130 may be any type of channel. In some embodiments, the communication channel 130 includes a wireline link/interface, e.g., copper line, optical fiber. In other embodiments, the communication channel 130 includes a wireless link/interface. In such embodiments, the transmitter 110 and the receiver 120 may communicate the signal in accordance with a wireless telecommunication protocol, such as Long Term Evolution (LTE), Worldwide Interoperability for Microwave Access (WiMAX), or Wi-Fi telecommunications protocol.

Upon reception, the receiver 120 performs various processing steps on the signal (e.g., analog to digital conversion, filtering) prior to symbol demodulation. The de-modulated signal is then decoded at the decoder 125 to obtain a decoded bit-stream. Notably, ISI equalization may be performed during, or after, symbol demodulation. In some embodiments, soft-output information (e.g., log likelihood ratios (LLRs)) is produced during equalization. The soft-output information may be provided to the decoder 125, where it is used as an input parameter for obtaining hard decisions during bit-level decoding. The soft-output information may be generated using various techniques, such as a soft output Viterbi algorithm (SOVA) or Bahl-Cocke-Jelinek-Raviv (BCJR) algorithm. It should be appreciated that the receiver 120 may include other components, such as components that perform symbol timing synchronization and carrier phase estimation and correction prior to symbol demodulation. ISI equalization may be performed by a full-response equalizer or a partial-response equalizer. A full-response equalizer performs ISI equalization under the assumption that transmit pulses satisfy the Nyquist ISI criterion such that the transmit pulses do not overlap in the time domain upon being transmitted. There may be varying amounts of overlap between the transmit pulses in time domain at the receiver due to channel distortion. In contrast, a partial-response equalizer may perform ISI equalization without assuming that the transmit pulses satisfy the Nyquist ISI criterion, and as a result the transmit pulses may have non-negligible overlap. Partial-response equalizers may use a post-filter to limit the number of adjacent symbols influencing the current symbol to a finite small number, which enables the utilization of various ISI equalization techniques, e.g., maximum likelihood sequence detection (MLSD).

Figure 2:
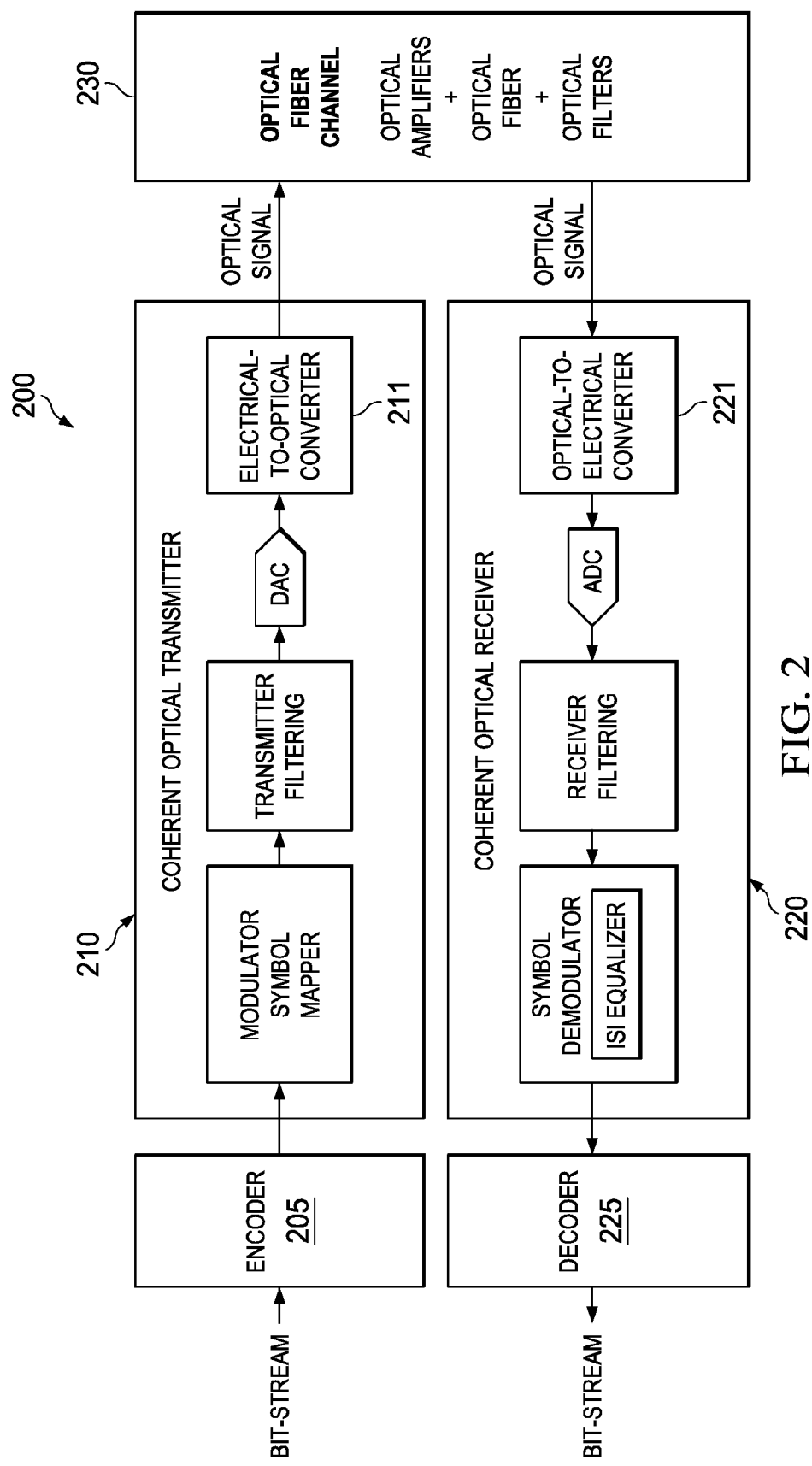
FIG. 2 is a diagram of a coherent optical communications system.

Embodiment ISI equalization techniques described herein can be implemented in coherent optical systems. FIG. 2 is a diagram of a coherent optical system 200 in which data is communicated from a coherent optical transmitter 210 to a coherent optical receiver 220 over an optical fiber channel 230. As shown, an encoder 205 encodes a bit-stream, and then forwards the encoded bit-stream to the coherent optical transmitter 210. The encoder 205 may be configured similarly to the encoder 105, and may use any type of encoding scheme, including forward error correction (FEC) encoding schemes. The coherent optical transmitter 210 then modulates the encoded bit-stream by mapping bits in the encoded bit stream to modulation symbols. The coherent optical transmitter 210 may also perform other signal processing steps (e.g., filtering, digital to analog conversion (DAC), amplification) prior to forwarding the signal to the electrical-to-optical converter 211. While the electrical-to-optical converter 211 is depicted as being a component of the coherent optical transmitter 210, it should be appreciated that the electrical-to-optical converter 211 may be an independent component that is separate from the coherent optical transmitter 210 in some embodiments. The electrical-to-optical converter 211 may also be referred to as an optical-electrical front end.

The electrical-to-optical converter 211 converts the signal into an optical signal prior to the optical signal being transmitted over the optical fiber channel 230 to the coherent optical receiver 220. The coherent optical channel 230 includes various components, including optical amplifiers, optical fiber, and optical switches and filters. Components of the coherent optical channel 230 may introduce distortion into the optical signal, particularly when the coherent optical channel 230 is a bandwidth limited channel, e.g., a channel in which the frequency response is zero above a certain cutoff frequency.

Upon reception, the coherent optical receiver 220 converts the optical signal to an analog electrical signal at the optical-to-electrical converter 221. Similar to the electrical-to-optical converter 211, the optical-to-electrical converter 221 may be an internal component of the coherent optical receiver 220, or an independent component that is separate from the coherent optical receiver 220. Thereafter, the coherent optical receiver 220 may perform various signal processing steps (e.g., analog to digital conversion, filtering) prior to symbol demodulation. ISI equalization may be performed during, or after, symbol demodulation. The coherent optical receiver 220 may perform chromatic dispersion (CD) compensation and/or polarization mode dispersion (PMD) compensation prior to ISI equalization. Additionally, soft-output information (e.g., LLRs) may be produced, which may be provided to the decoder 225 as an input for producing hard decisions during bit-level decoding.

Some ISI estimation techniques model the channel as a tapped delay line finite impulse response (FIR) filter. Such techniques may use a time-domain tap estimation technique, to determine the taps for the FIR filter. The FIR filter may then be used to condition the received signal prior to symbol demodulation.

Figure 3:
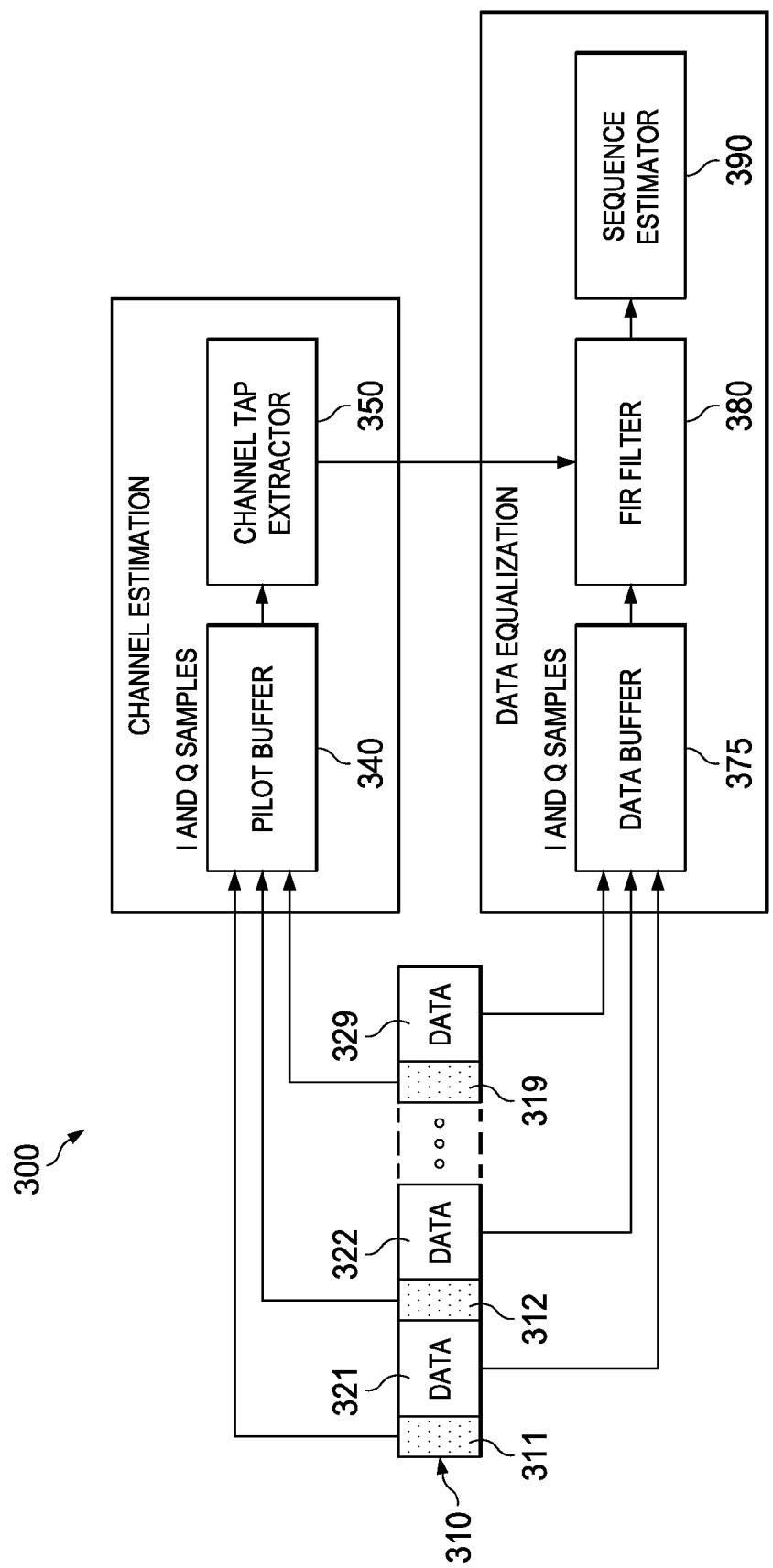
FIG. 3 is a diagram of an embodiment ISI equalizer with partial channel estimation.

FIG. 3 is an embodiment ISI equalizer 300 for performing ISI equalization on a signal 310. In this example, the signal 310 carries a set of discontinuous pilots 311, 312, 319 as well as data 321, 322, 329. The pilots 311, 312, 319 include known sequences of symbols that are analyzed during channel estimation. The data 321, 322, 329 includes sequences of symbols that are processed (e.g., demodulated, decoded, etc.) to obtain information. The pilots 311, 312, 319 and the data 321, 322, 329 are communicated in a sequence of frames transmitted over a series of time intervals. Each frame includes one of the pilots 311, 312, 319 and one of the data 321, 322, 329, and is transmitted in a different time interval. For example, the pilot 311 and the data 321 are communicated in a frame transmitted during one time interval, and the pilot 312 and the data 322 are communicated in another frame transmitted during the following time interval.

As shown, the ISI equalizer 300 comprises a pilot buffer 340, a channel tap extractor 350, a data buffer 375, an FIR filter 380, and a sequence estimator 390. The pilot buffer 340 may include any component or collection of components adapted to store the pilots 311, 312, 319. The data buffer 375 may include any component or collection of components adapted to store the data 321, 322, 329. The channel tap extractor 350 may include any component or collection of components for analyzing the pilots 311, 312, 319 to obtain a set of tap coefficients. The FIR filter 380 may include any component or collection of components adapted to filter the data 321, 322, 329 based on the set of tap coefficients to obtain a conditioned signal. The conditioned signal is then forwarded to a sequence estimator 390, which demodulates symbols in the conditioned signal.

Figure 4:
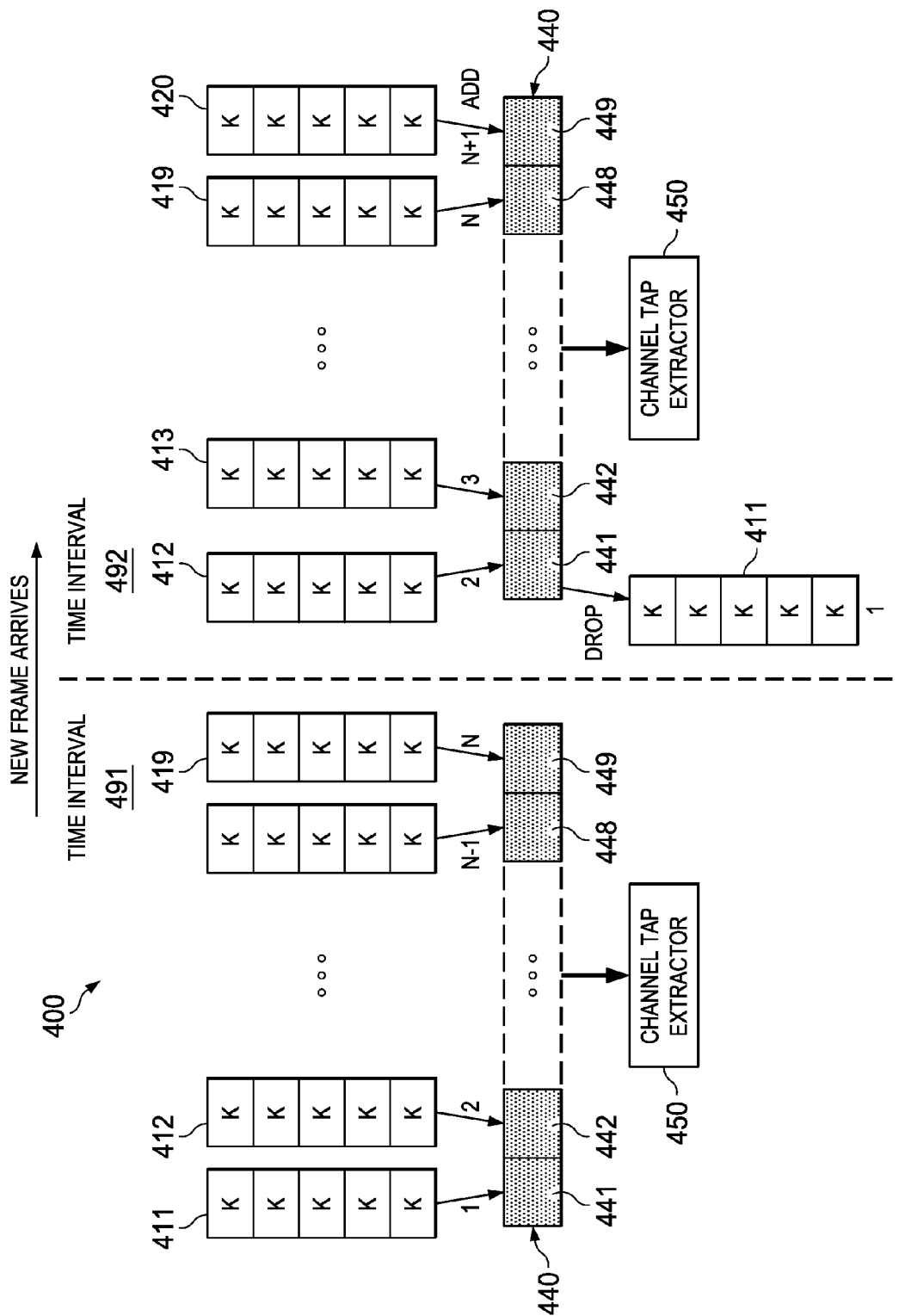
FIG. 4 is a set of diagrams demonstrating how channel estimation is performed on pilots stored in a pilot buffer over the course of two time intervals.

FIG. 4 is a set of diagrams 400 demonstrating how channel estimation is performed on pilots stored in a pilot buffer 440 over the course of two time periods 491, 492. In this example, a channel tap extractor 450 analyzes, during each time period, pilots stored in the pilot buffer 440 to obtain a set of tap coefficients for performing ISI equalization for the decoding of one or more frames. The pilot buffer 440 includes memory locations 441, 442, 448, 449 for storing pilots from N received frames (N is an integer greater than one). The frames may or may not be contiguous. Pilots within each frame may be further divided into several sub-frames, each carrying a plurality of pilot symbols (K). Pilot symbols (K) of one of the frames 411-420 may be continuous (in the time domain) with other pilot symbols in the same sub-frame, but discontinuous (in the time domain) with pilot symbols in different sub-frames. Although the pilot buffer 440 is depicted as storing pilots from four or more discontinuous frames, it should be appreciated that the pilot buffer 440 may store pilots fromas few as two discontinuous frames in some embodiments.

As shown in diagram 401, pilots 411-419 are stored in the memory locations 441-449 of the pilot buffer 440 when ISI estimation is performed during the time period 491. A pilot 420 is added to the pilot buffer 440 during the time period 492. To make room for the pilot 420, the oldest pilot (i.e., the pilot 411) is dropped from the pilot buffer 440. In this way, the channel tap extractor 450 generates the set of tap coefficients from the most recently extracted pilots. Note, that the pilots may be extracted from fewer than all frames in some embodiments. Each of the pilots 411-420 was carried in a different frame, with each frame being transmitted during a different time interval. The order in which the frames were received corresponds to the index (1, 2, . . . , N, N+1) beneath each of the pilots 411-420. For example, the frame carrying the pilot 411 was received before the frame carrying the pilot 412.

It may be helpful to extract an unbiased noise vector from the received pilots before extracting tap coefficients. In some embodiments, the noise vector is determined via auto-regressive modeling. For example, it is possible to remove bias in the noise using the following equation: N_unbiased=N−mean(N), where N_unbiased is the unbiased noise vector, N is the number of pilot symbols being used for the current tap estimation, and mean(N) is noise term averaged over all the pilot symbols being used for noise parameter estimation. Notably, the unbiased noise vector may provide the relative weights of the tap coefficients.

Tap coefficients can be estimated using principles of parametric spectral estimation. In one example, a set of reflection coefficients are computed using a recursive technique, such as Levinson-Durbin recursion. During the computation, the reflection coefficients may be obtained by minimizing the estimates of the prediction error, which may be represented by the following equation:

$$m_k = \frac{-2\sum_{n=k}^{N-1} f_{k-1}(n) b_{k-1}(n-1)}{\sum_{n=k}^{N-1} (|f_{k-1}(n)|^2 + |b_{k-1}(n-1)|^2)}.$$

where err(k) is the prediction error, $f_k$ is a forward prediction error, $b_k$ is a backward prediction error, N is the number of pilot symbols being used for the current tap estimation, k is the coefficient index and number of coefficients is equal to the model order, n is an index term for the number of pilot symbols being used, and $m_k$ is k-th tap coefficient to be estimated. In an embodiment, the forward prediction error is obtained according to the following equation: $f_k(n)=f_{k-1}(n-1)+m_k b_{k-1}(n-1)$. In the same or different embodiment, the backward prediction error is obtained according to the following equation: $b_k(n)=b_{k-1}(n-1)+m_k f_{k-1}(n)$. The forward and backward prediction errors may be initialized according to $f_0(n)=b_0(n)=x(n)$, where x(n) is the nth sample. In the same or different embodiments, the kth tap estimate may be solved according to the following equation:

$$err(k) = \frac{1}{2(N-k)} \sum_{n=k}^{N-1} \{((f_{k-1}(n) + m_k b_k(n-1))^2 + ((b_{k-1}(n) + m_k b_{k-1}(n))^2\},$$

Figure 5:
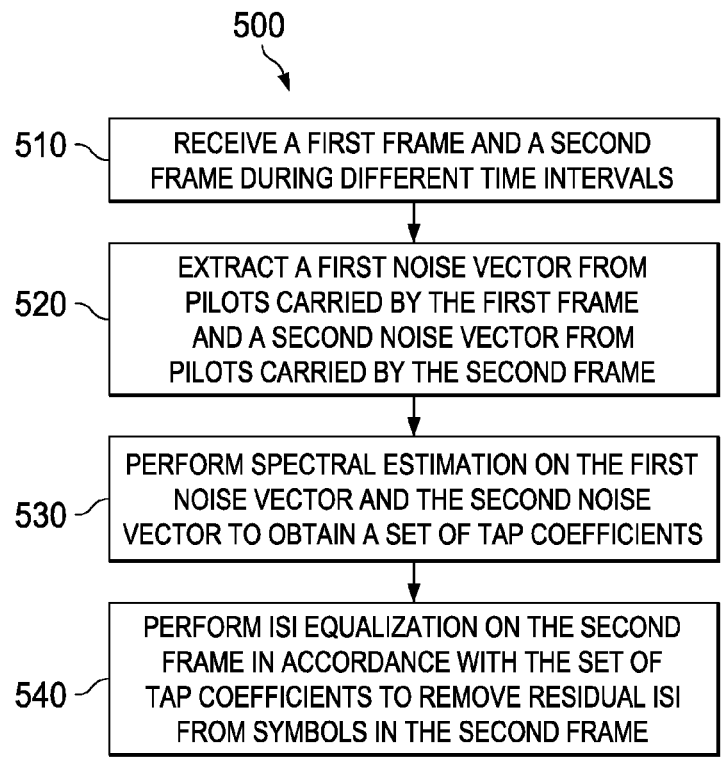
FIG. 5 is a flowchart of an embodiment method for performing ISI estimation.

FIG. 5 is a flowchart of an embodiment method 500 for performing ISI estimation, as might be performed by a receiver. At step 510, the receiver receives a signal carrying a first frame and a second frame. The first frame is received during a different time period than the second frame. The first frame and the second frame may be received during consecutive periods or non-consecutive periods. At step 520, the receiver extracts a first noise vector from pilots carried by the first frame and a second noise vector from pilots carried by the second frame. The pilots carried by the first frame are discontinuous in the time domain with the pilots carried in the second frame. At step 530, the receiver performs spectral estimation on the first noise vector and the second noise vector to obtain a set of tap coefficients. In some embodiments, the first noise vector is combined with the second noise vector to obtain a long noise vector, and the set of tap coefficients are computed from the long noise vector. Other noise vectors (e.g., noise vectors from other pilots) may also be used to obtain the set of tap coefficients, depending on the size of the pilot buffer. At step 540, the receiver performs ISI equalization on the second frame to remove residual ISI from symbols in the second frame. The second frame may then be demodulated and decoded to obtain information carried by the second frame. It should be appreciated that the ISI equalization may be performed in a manner that does not interrupt, or otherwise delay, demodulation and/or decoding of the second frame.

In some embodiments, tap coefficients are computed for each frame. In other embodiments, tap coefficients are computed for fewer than all frames. For example, a new set of tap coefficients may be computed according to a pattern, e.g., every other frame, every third frame. In such an example, a receiver may perform ISI equalization on a new frame without computing any additional tap coefficients for the new frame when fewer than a threshold number of frames have been received since the previous set of tap coefficients were computed. This may reduce the processing load placed on the equalizer. In other embodiments, a new set of tap coefficients may be discarded, without being used for ISI equalization, when a difference between the new set of tap coefficients and a previous set of tap coefficients fails to satisfy one or more criteria. For example, the criteria may be satisfied when a mean or median difference between respective coefficients in the new set of tap coefficients and the previous set of tap coefficients exceeds a threshold. As another example, the criteria may be satisfied when a largest difference between two respective coefficients in the new set of tap coefficients and the previous set of tap coefficients exceeds a threshold.

Figure 6:
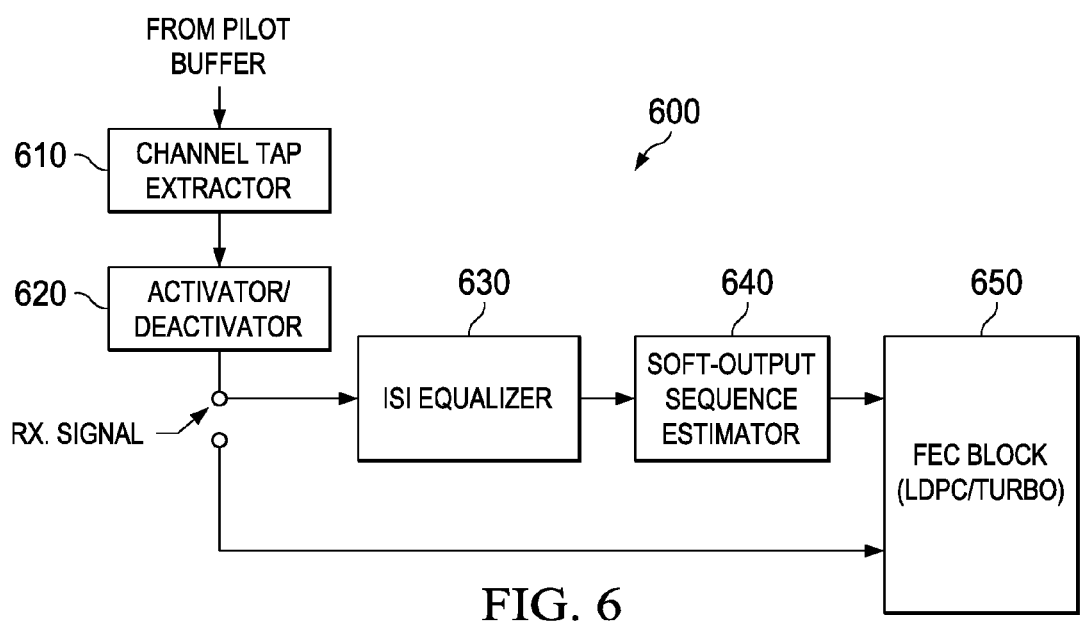
FIG. 6 is a diagram of an embodiment signal processor for dynamically activating/de-activating an ISI equalizer.

Aspects of this disclosure provide techniques for dynamically activating/deactivating an ISI equalizer to improve signal decoding efficiency. FIG. 6 is a diagram of an embodiment signal processor 600 for dynamically activating/de-activating an ISI equalizer 630. The signal processor 600 may be a set of components in a receiver. As shown, the signal processor 600 comprises a channel tap extractor 610, an activator/deactivator 620, the ISI equalizer 630, a soft-output sequence estimator 640, and an FEC block decoder 650. The channel tap extractor 610 performs channel estimation on pilots of a signal to obtain a set of tap coefficients. This may include extracting a noise vector from pilots carried in the signal, and performing spectral estimation on the noise vector to obtain the set of tap coefficients. Notably, the set of tap coefficients include at least a first tap coefficient corresponding to an energy level of a leading symbol in the signal, and a second tap coefficient corresponding to an amount of energy that leaks from the leading symbol to the trailing symbol as a result of ISI introduced by the channel. The channel tap extractor 610 then provides the set of tap coefficients to the activator/deactivator 620 and the ISI equalizer 630. The activator/deactivator 620 compares a ratio between tap coefficients to determine whether or not to activate/de-activate the ISI equalizer 630. For example, the activator/deactivator 620 may activate the ISI equalizer 630 when a ratio between tap coefficients (e.g., a ratio of the second tap coefficient to the first tap coefficient) exceeds a threshold. As another example, the activator/deactivator 620 may de-activate the ISI equalizer 630 when a ratio between tap coefficients (e.g., a ratio of the second tap coefficient to the first tap coefficient) falls below a threshold. The threshold for activating the ISI equalizer 630 may be equal to the threshold for de-activating the ISI equalizer 630. Alternatively, the threshold for activating the ISI equalizer 630 may be greater than the threshold for de-activating the ISI equalizer 630 to reduce the frequency with which the ISI equalizer 630 is activated/deactivated. When activated, the ISI equalizer 630 performs ISI equalization on the signal, and forwards the equalized signal to the soft-output sequence estimator 640. The soft-output sequence estimator 640 computes soft output information (e.g., LLRs) from the equalized signal, and forwards the equalized signal to the FEC block decoder 650. The FEC block decoder 650 performs signal decoding based on the soft-output information to obtain the decoded signal. When de-activated, the ISI equalizer 630 does not perform ISI equalization on the signal, in which case the signal is forwarded directly to the FEC block decoder 650 for signal decoding. The FEC block decoder 650 may achieve lower bit-error-rates when having access to the soft-output information, while the overall processing complexity, delay, and/or power consumption of the signal processor 600 may be reduced when the ISI equalizer 630 and/or soft-output sequence estimator 640 are deactivated.

Figure 7:
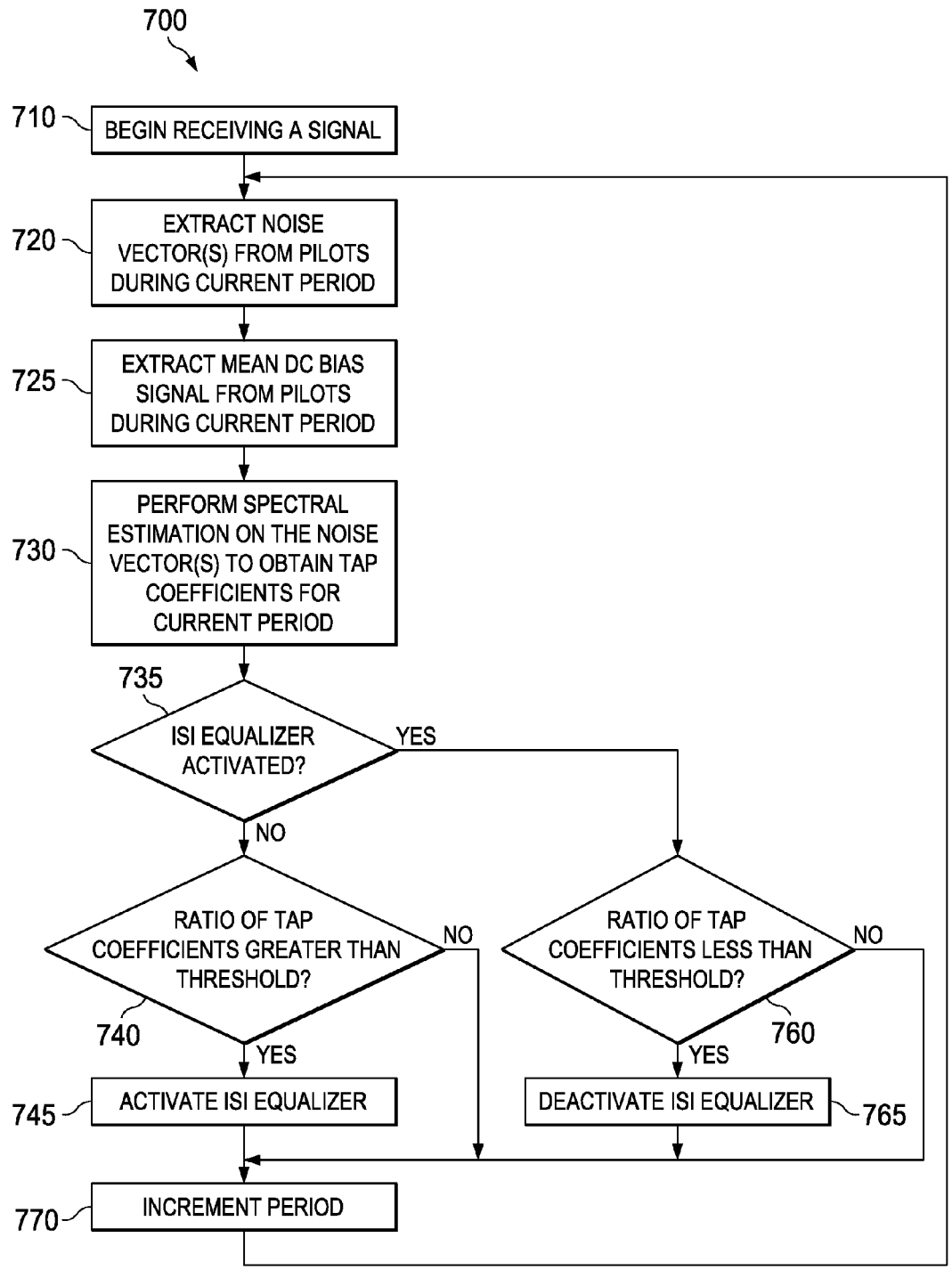
FIG. 7 is a flowchart of an embodiment method for dynamically activating or deactivating an ISI equalizer.

FIG. 7 is a flowchart of an embodiment method 700 for dynamically activating or deactivating an equalizer, as may be performed by a receiver. At step 710, the receiver begins receiving a signal. At step 720, the receiver extracts a noise vector from pilots carried by the signal during a current period. At step 725, the receiver extracts a mean DC bias signal from the pilots received during the current period. At step 730, the receiver performs spectral estimation on the noise vector to obtain at least a first tap coefficient and a second tap coefficient. At step 740, the receiver determines whether the ISI equalizer is activated. If the ISI equalizer is not currently activated, then the receiver determines whether a ratio of tap coefficients obtained for the current period exceeds a threshold at step 740. If the ratio of tap coefficients is determined to exceed the threshold at step 745, then the receiver activates the ISI equalizer at step 745 before incrementing the period at step 770. Otherwise, the receiver increments the period at step 770 without activating the ISI equalizer.

If the receiver determines that the ISI equalizer is currently activated at step 735, then the receiver determines whether a ratio of tap coefficients obtained for the current period is less than a threshold at step 760. If the ratio of tap coefficients is determined to be less than the threshold at step 760, then the receiver de-activates the ISI equalizer at step 765 before incrementing the period at step 770. Otherwise, the receiver increments the period at step 770 without de-activating the ISI equalizer. Thereafter, steps 720-770 are repeated as long as the receiver continues to receive the signal. In some embodiments, a delay is implemented at step 770 such that the activation/de-activation are performed semi-statically. This may reduce power consumption in the receiver. In other embodiments, activation/de-activation is performed without any delay. In one example, embodiment ISI activation/deactivation techniques are employed in a receiver that analyzes discontinuous pilots. In such an example, the current period includes two or more time intervals. In other examples, embodiment ISI activation/deactivation techniques are employed in a receiver that analyzes continuous pilots.

Figure 8:
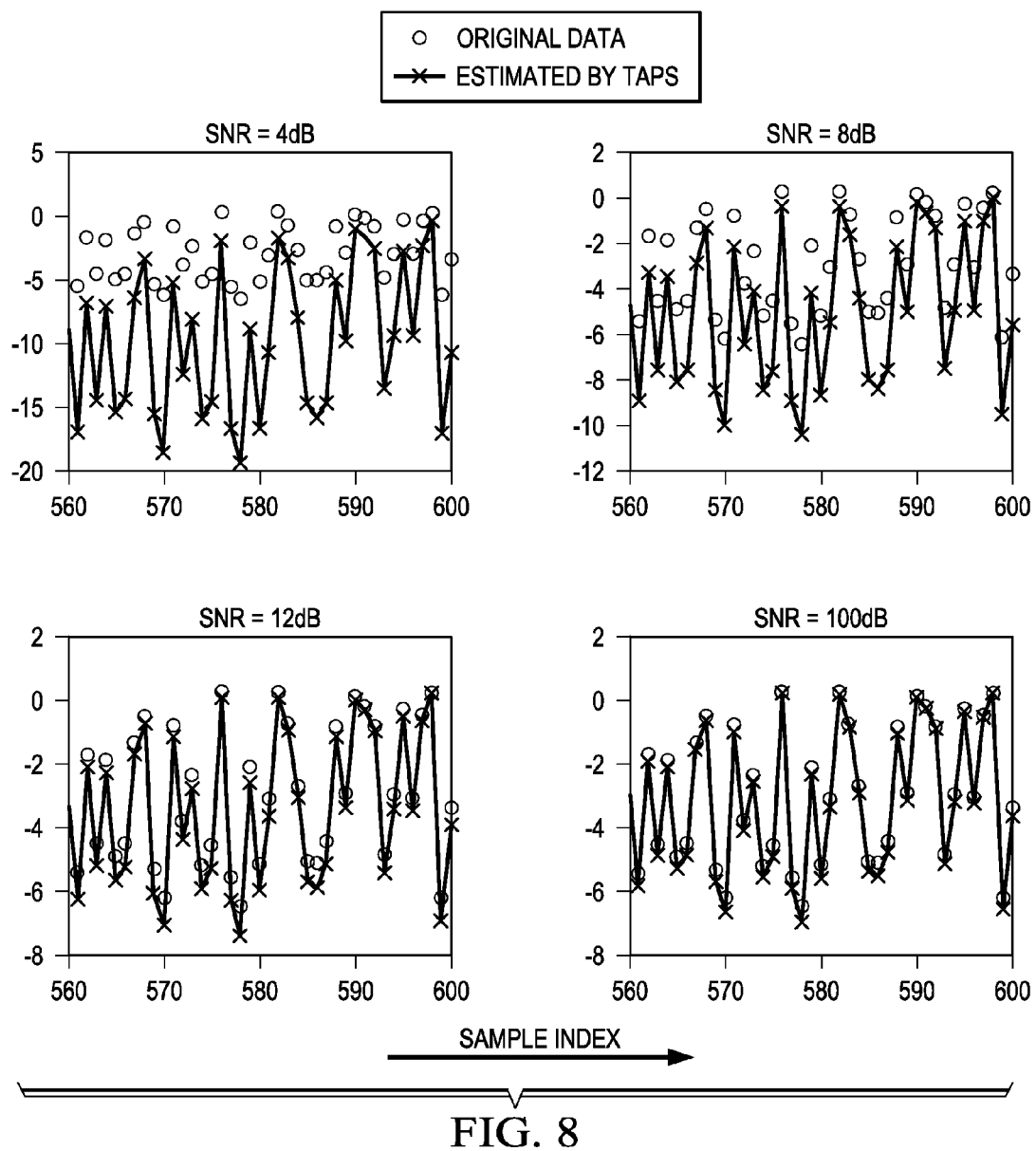
FIG. 8 is a set of graphs of simulation results demonstrating mean square error (MSE) rates for a filtered sample sequence obtained from performing channel estimation on discontinuous pilots.

FIG. 8 is a set of graphs of the mean square error (MSE) between an original sample sequence and a filtered sample sequence obtained using the ISI estimation technique using discontinuous pilots as described above. In FIG. 8, the circles denote the filtered sequence of symbols and the crosses denote the sequence obtained by filtering the signal using the tap estimates obtained using embodiment ISI estimation techniques provided herein. The original sample sequence is passed through a third order autoregressive (AR) channel and the estimation technique is applied at different signal-to-noise ratios (SNRs), where the noise power used to compute the SNR value is modeled as additive white Gaussian noise (AWGN). The graphs demonstrate that the embodiment ISI estimation techniques are more accurate for higher levels of SNR than for lower levels of SNR. As shown, a high level of correlation is observed in the sequences, which indicates that the embodiment tap coefficient estimation techniques provided herein are fairly accurate for moderate and high signal-to-noise ratios (SNRs).

Figure 9:
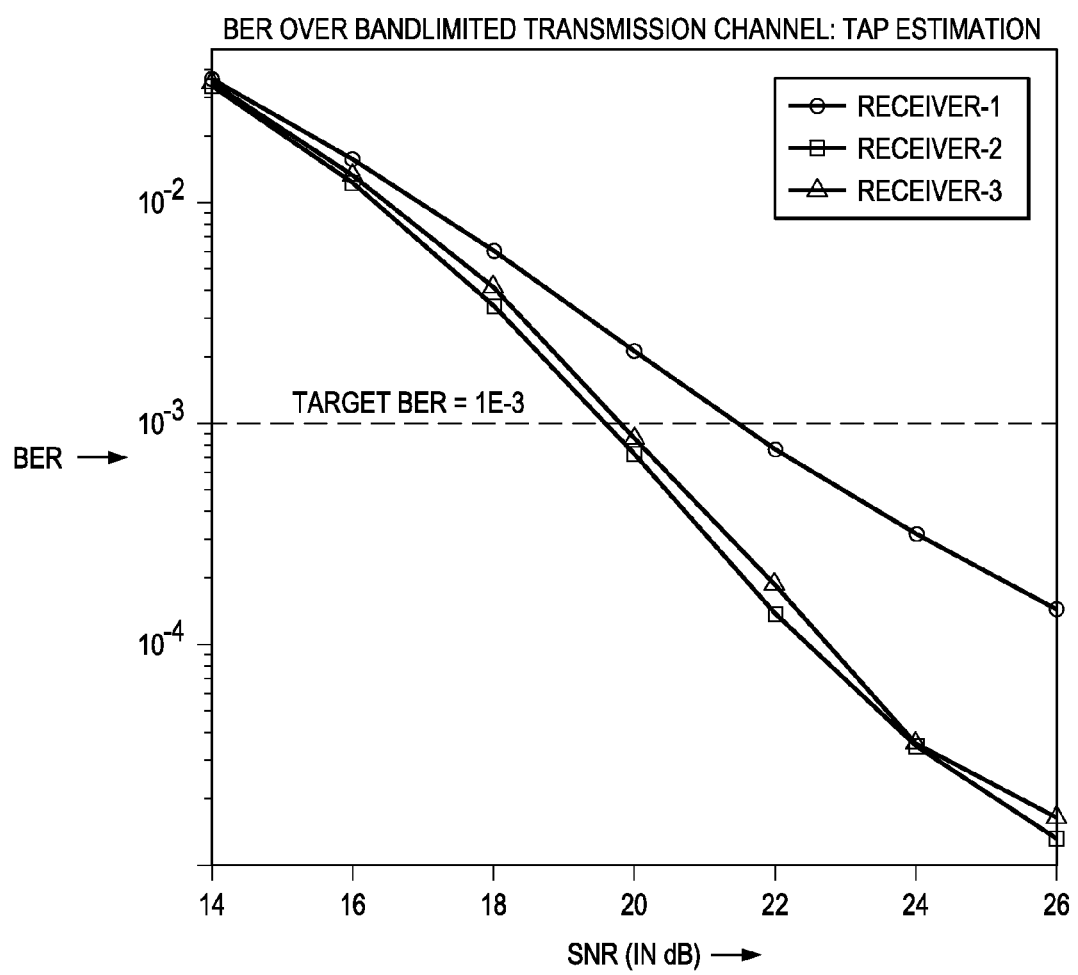
FIG. 9 is a graph of simulation results demonstrating bit error rates (BERs) for a filtered sample sequence obtained from performing channel estimation on discontinuous pilots.

FIG. 9 is a graph of simulation results demonstrating bit error rates (BERs) for three different coherent optical receivers. The first receiver (receiver-1) employs no ISI estimation. The second receiver (receiver-2) employs ideal ISI equalization as would occur if a receiver hypothetically had knowledge of the exact ISI introduced into the signal. Therefore, the second receiver demonstrates the best possible performance under the channel conditions tested. The third receiver (receiver-3) employs an embodiment discontinuous pilot ISI equalization. As shown, embodiment discontinuous pilot ISI equalization technique achieves BER performance levels that are similar to those achieved by ideal ISI equalization for the channel conditions tested.

Figure 10:
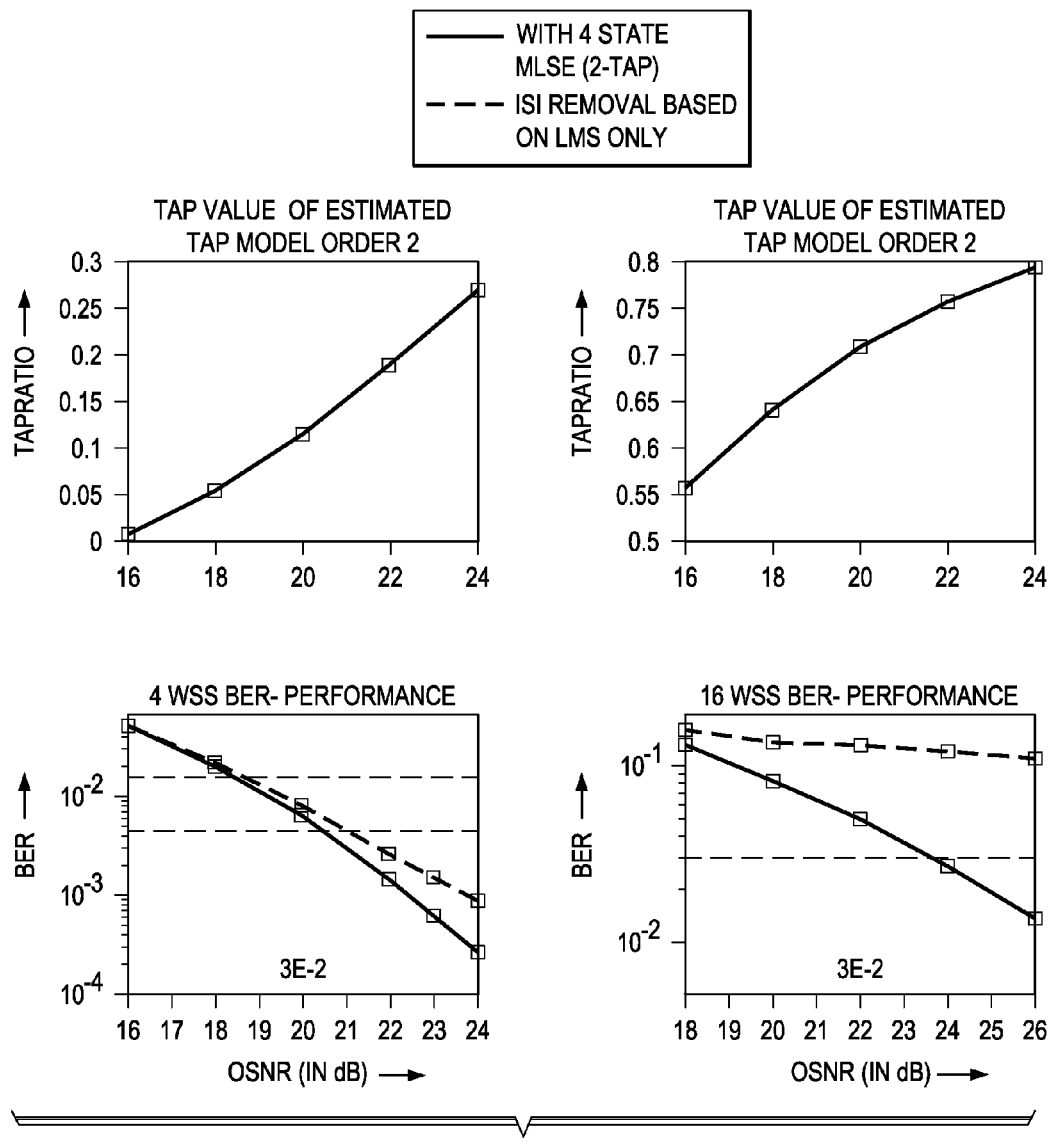
FIG. 10 is a set of graphs of simulation results obtained from performing channel estimation on discontinuous pilots carried by a signal communicated over an optical channel.

FIG. 10 is a set of graphs demonstrating the ratio of tap coefficients and BER performance achieved by embodiment discontinuous ISI equalization techniques under two different channel conditions for a coherent optical path. The residual ISI is much higher when there are 16 wavelength selective switches (WSS) in the optical path than when only 4 WSSs are present. Correspondingly, the top figures show the increasing influence of the ISI as the effect of white Gaussian noise diminishes with increasing SNR. When there are only 4 WSSs, the tap ratio is limited to approximately 0.25. When there are 16 WSSs, the tap ratio increases to about 0.8. This translates into increased BER performance for embodiment discontinuous pilot ISI equalization techniques employed in optical channels exhibiting 16 WSSs compared to optical channels exhibiting 4 WSSs.

Figure 11:
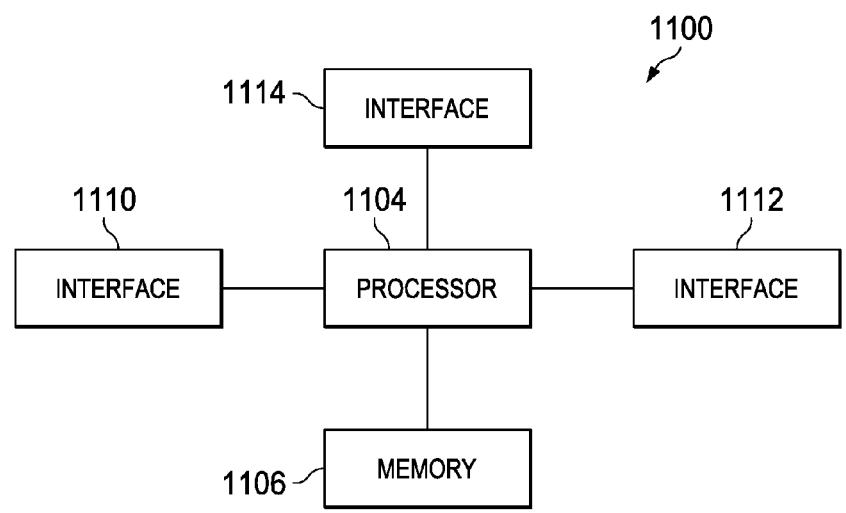
FIG. 11 is a block diagram of an embodiment processing system.

FIG. 11 is a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC)) to interact/communicate with the processing system 1100. The processing system 1100 may include additional components not depicted in FIG. 11, such as long term storage (e.g., non-volatile memory).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch), or any other device adapted to access a telecommunications network.

Figure 12:
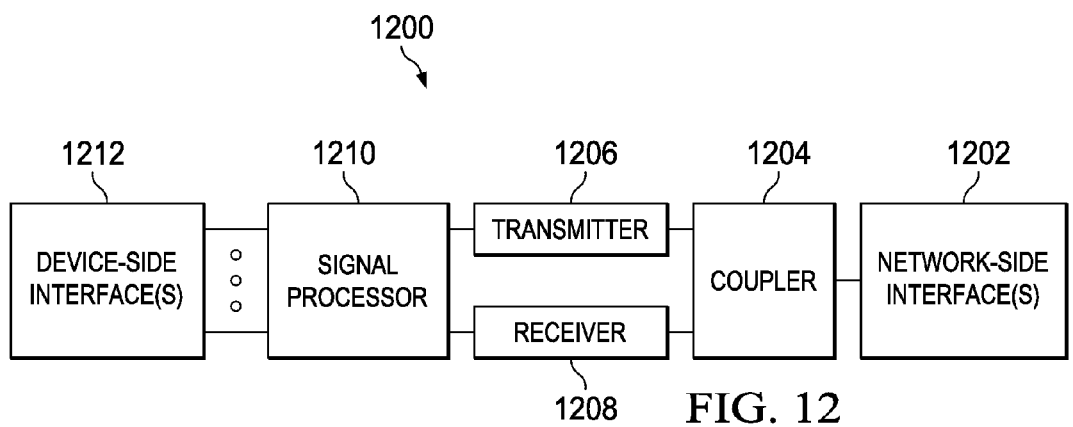
FIG. 12 is a block diagram of an embodiment transceiver.

In some embodiments, one or more of the interfaces 1110, 1112, 1114 connects the processing system 1100 to a transceiver adapted to transmit and receive signaling over the telecommunications network. FIG. 12 is a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier) adapted to convert a baseband signal into a modulated carrier signal suitable for transmission over the network-side interface 1202. The receiver 1208 may include any component or collection of components (e.g., down-converter, low noise amplifier) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE)), a wireless local area network (WLAN) protocol (e.g., Wi-Fi), or any other type of wireless protocol (e.g., Bluetooth, near field communication (NFC)). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO) In other embodiments, the transceiver 1200 transmits and receives signaling over a wireline medium, e.g., twisted-pair cable, coaxial cable, optical fiber. Specific processing systems and/or transceivers may utilize all of the components shown, or only a subset of the components, and levels of integration may vary from device to device.

What is claimed:

1. A method for performing inter-symbol interference (ISI) estimation, the method comprising:
   receiving a first frame and a second frame of a signal, wherein the first frame and the second frame are communicated during different time intervals;
   extracting a first noise vector from at least one pilot carried by the first frame and a second noise vector from at least one pilot carried by the second frame;
   storing the first noise vector and the second noise vector in a buffer;
   performing spectral estimation on at least the first noise vector and the second noise vector to obtain a first set of tap coefficients; and
   performing ISI equalization on the second frame in accordance with the first set of tap coefficients to remove residual ISI from symbols in the second frame.

2. The method of claim 1, wherein the at least one pilot carried by the first frame and the at least one pilot carried in the second frame are discontinuous in the time domain.

3. The method of claim 1, wherein the signal is communicated over a coherent optical network, and wherein the residual ISI includes ISI introduced by electronic and optical components of the coherent optical network.

4. The method of claim 3, wherein the residual ISI includes ISI that remains in the signal after chromatic dispersion (CD) compensation has been performed on the signal.

5. The method of claim 3, wherein the residual ISI includes ISI introduced by an electrical filter or an optical filter in the coherent optical network.

6. The method of claim 1, further comprising:
   computing metrics of a sequence estimator in accordance with the first set of tap coefficients for a sequence estimator with a finite amount of channel memory.

7. The method of claim 1, further comprising:
   receiving a third frame in the signal, the third frame being received after the first frame and the second frame; and
   performing ISI equalization on the third frame in accordance with the first set of tap coefficients without computing any additional sets of tap coefficients.

8. The method of claim 1, further comprising:
   receiving a third frame in the signal, the third frame being received after the first frame and the second frame; and
   performing ISI equalization on the third frame in accordance with the first set of tap coefficients without computing any additional sets of tap coefficients when fewer than a threshold number of frames have been received since computing the first set of tap coefficients.

9. The method of claim 1, further comprising:
receiving a third frame in the signal, the third frame being communicated during a different time interval than the first frame and the second frame;
extracting a third noise vector from at least one pilot in the third frame;
performing spectral estimation on at least the third noise vector to obtain a second set of tap coefficients;
determining whether a difference between the second set of tap coefficients and the first set of tap coefficients satisfies one or more criteria; and
performing ISI equalization on the third frame in accordance with the first set of tap coefficients when the difference between the second set of tap coefficients and the first set of tap coefficients fails to satisfy the one or more criteria.

10. The method of claim 9, wherein the difference between the second set of tap coefficients and the first set of tap coefficients satisfies the one or more criteria when a mean difference between respective coefficients in the second set of tap coefficients and the first set of tap coefficients exceed a threshold.

11. The method of claim 10, wherein the difference between the second set of tap coefficients and the first set of tap coefficients satisfies the one or more criteria when a largest difference between two respective coefficients in the second set of tap coefficients and the first set of tap coefficients exceeds a threshold.

12. The method of claim 1, wherein the ISI equalization is performed using a full response equalizer.

13. The method of claim 1, wherein the ISI equalization is performed using a partial response equalizer.

14. The method of claim 1, wherein the method further comprises:
receiving a third frame in the signal, the third frame trailing the second frame in the signal, and the second frame trailing the first frame in the signal;
extracting a third noise vector from pilots carried by the third frame;
dropping the first noise vector from the buffer;
storing the third noise vector in the buffer;
performing spectral estimation on at least the second noise vector and the third noise vector to obtain a second set of tap coefficients; and
performing ISI equalization on the third frame in accordance with the second set of tap coefficients to remove residual ISI from symbols in the third frame.

15. The method of claim 1, wherein the signal carries constant modulus phase-shift keying (PSK) modulated symbols.

16. The method of claim 1, wherein the signal carries multi-level quadrature amplitude modulated (QAM) symbols.

17. The method of claim 1, wherein the buffer storing the first noise vector and the second noise vector consists of on-chip memory such that the first set of tap coefficients is obtained without fetching data from off-chip memory.

18. A receiver comprising:
a processor; and
a non-transitory computer readable storage medium storing programming for execution by the processor, the programming including instructions to:
receive a first frame and a second frame of a signal, wherein the first frame and the second frame are communicated during different time intervals;
extract a first noise vector from at least one pilot carried by the first frame and a second noise vector from at least one pilot carried by the second frame;
store the first noise vector and the second noise vector in a buffer;
perform spectral estimation on at least the first noise vector and the second noise vector to obtain a first set of tap coefficients; and
perform inter-symbol interference ISI equalization on the second frame in accordance with the first set of tap coefficients to remove residual ISI from symbols in the second frame.

19. A method for dynamically activating or deactivating an equalizer, the method comprising:
receiving a signal carrying at least a leading symbol and a trailing symbol;
extracting a noise vector from at least one pilot carried by the signal;
performing spectral estimation on the noise vector to obtain at least a first tap coefficient and a second tap coefficient, wherein the first tap coefficient corresponds to an energy level of a leading symbol in the signal, and wherein the second tap coefficient corresponds to an amount of energy that leaks from the leading symbol to the trailing symbol as a result of inter-symbol interference (ISI); and
activating an ISI equalizer when a ratio of the second tap coefficient to the first tap coefficient exceeds a first threshold, wherein the ISI equalizer is configured to perform ISI equalization on the signal when activated.

20. The method of claim 19, further comprising:
de-activating the ISI equalizer when the ratio of the second tap coefficient to the first tap coefficient fails to exceed a second threshold, wherein the signal is decoded without ISI equalization when the ISI equalizer is de-activated.

21. The method of claim 20, wherein the first threshold is greater than the second threshold.

22. The method of claim 20, wherein the first threshold is equal to the second threshold.

* * * * *